(12) United States Patent
Rosenberg

(10) Patent No.: US 7,106,347 B1
(45) Date of Patent: Sep. 12, 2006

(54) TRANSFORMING PIXEL DATA AND ADDRESSES

(75) Inventor: Scott A. Rosenberg, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 09/584,604

(22) Filed: May 31, 2000

(51) Int. Cl.
*G09G 5/20* (2006.01)
*G09G 5/06* (2006.01)

(52) U.S. Cl. ...................... 345/619; 345/533

(58) Field of Classification Search ............... 345/564, 345/566, 568, 531, 532, 542, 541, 543, 544, 345/545–554, 571, 581, 619, 533
See application file for complete search history.

(56) References Cited

U.S. PATENT DOCUMENTS

| | | | | |
|---|---|---|---|---|
| 4,513,390 A | * | 4/1985 | Walter et al. ............... | 345/501 |
| 4,541,116 A | * | 9/1985 | Lougheed ................... | 382/303 |
| 4,860,375 A | * | 8/1989 | McCubbrey et al. ........ | 382/303 |
| 4,949,390 A | * | 8/1990 | Iverson et al. .............. | 382/258 |
| 5,361,387 A | * | 11/1994 | Millar et al. ............... | 345/543 |
| 5,381,533 A | * | 1/1995 | Peleg et al. ................. | 712/215 |
| 5,392,385 A | * | 2/1995 | Evangelisti et al. ........ | 345/611 |
| 5,706,483 A | * | 1/1998 | Patrick et al. ............... | 345/562 |
| 5,859,788 A | * | 1/1999 | Hou ........................... | 708/400 |
| 5,970,111 A | * | 10/1999 | Samarasekera et al. ........ | 378/4 |
| 6,002,411 A | * | 12/1999 | Dye ........................... | 345/542 |
| 6,348,910 B1 | * | 2/2002 | Yamamoto et al. ......... | 345/102 |
| 6,469,703 B1 | * | 10/2002 | Aleksic et al. .............. | 345/542 |
| 6,469,799 B1 | * | 10/2002 | Kajita ........................ | 358/1.16 |
| 6,538,656 B1 | * | 3/2003 | Cheung et al. ............. | 345/519 |
| 6,593,931 B1 | * | 7/2003 | Mastronarde et al. ........ | 345/535 |
| 6,777,663 B1 | * | 8/2004 | Mattison ................. | 250/214 A |
| 2001/0021971 A1 | * | 9/2001 | Gibson et al. .............. | 712/215 |
| 2001/0050330 A1 | * | 12/2001 | Mattison ................... | 250/208.1 |
| 2003/0103056 A1 | * | 6/2003 | Margulis ..................... | 345/542 |

OTHER PUBLICATIONS

Pre-fetching with the segmented LRU algorithm ; Pendse, R.; Bhagavathula, R.; Circuits and Systems, 1999. 42nd Midwest Symposium on , vol. 2 , Aug. 8-11, 1999 pp. 862-865 vol. 2.*
Prepetching in a texture cache architecture; Homan Igehy; Matthew Eldridge; Kekoa Proudfoot; ACM 1998 Stanford University, pp. 133-142.*
A Comparison of MPI, SHMEM and Cache-coherent Shared Address Space Programming Models on the SGI Origin2000; Hongzhang Shan and Jaswinder Pal Singh Department of Computer Science Princeton University, pp. 329-338.*
Co-Design of Interleaved Memory Systems Hua Lin and Wayne Wolf, Department of Electrical Engineering, Princeton University□□pp. 46-50.*
The authoritative dictionary of IEEE standards terms seventh edition, pp. 426 and 1199.*

* cited by examiner

*Primary Examiner*—Kee M. Tung
*Assistant Examiner*—J. Amini
(74) *Attorney, Agent, or Firm*—Trop, Pruner & Hu, P.C.

(57) ABSTRACT

In a passive pixel data handling system, pixel data may be transferred to a transfer function, at a given address range. The transfer function may perform a transformation and readdress the pixel data. For example, the data may be received through a media port target which transfers the pixel data to a transfer function located at an address range in virtual memory. Each transfer function may readdress the pixel data and forward it to a media port write back engine or to the memory address range of another transfer function.

29 Claims, 6 Drawing Sheets

TRANSFORMING PIXEL DATA AND ADDRESSES

BACKGROUND

This invention relates generally to graphics or video engines commonly used in computer systems.

A graphics or video engine is responsible for processing or manipulating data received from a pixel source such as a processor, a graphics controller or other devices. The graphics/video engine takes the pixel data and operates on that pixel data in a variety of well known ways. For example, the color space of the pixel data may be converted using routine algorithms. Alternatively, the pixel data may be scaled to change the size of the displayed information, again using well known algorithms. Similarly, the pixel data may be subjected to composition effects such as blurring, contrasting or other distortions.

In the conventional process, pixels are generated and deposited into memory as a result of a drawing operation such as three dimensional or video based rendering. To impose additional transformations like color space conversion or scaling, these pixels are then typically fetched from memory by a "fetch" engine. The operation is imposed and the pixels are then written back to the same memory location. The imposition of the transformation is termed "active" because it requires an explicit fetch engine to be set up with the parameters of the operation.

Thus, when a number of transformations are involved with given pixel data, many fetch engines may be needed that have the redundant functionality of generating pixel addresses. The use of these fetch engines complicates the memory controller that must operate with all of the fetch engines contending for memory bandwidth.

The need to use the fetch engines may also reduce the available memory bandwidth because of the need for read-modify-write cycles when imposing filtering operations after rendering. Moreover, when multiple transformations are needed, the programmer must awkwardly impose the transformations by causing the fetch engine to manipulate the data between a memory location and the various transformation engines. In addition, there is no easy way to cause multiple transformations to occur in a serial fashion.

Thus, there is a need for better ways to impose transformations on pixel data in graphic/video engines.

DETAILED DESCRIPTION

Figure 1:
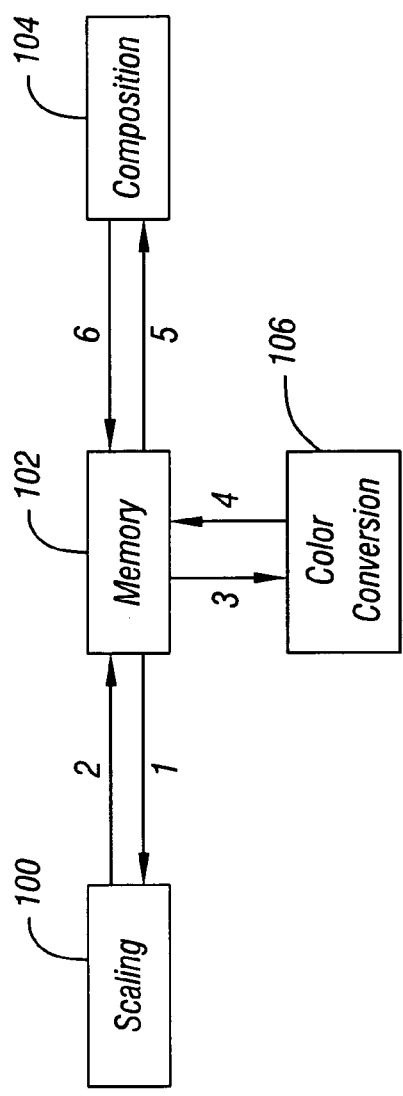
FIG. 1 is a schematic depiction of the prior art.

Referring to FIG. 1, in the conventional active system of imposing transformations on pixel data, the pixel data may be operated on by a plurality of transformation engines such as the scaling engine 100, the color conversion engine 106, and the composition engine 104. To do so, a fetch engine (not shown) fetches the data from memory and passes it to a first transformation engine, such as the scaling engine 100, as indicated by the arrow marked 1. When the transformation is complete, the fetch engine returns the data to the memory 102 as indicated by the arrow 2. Similarly, the data may be shuttled between the color conversion engine 106 and the composition engine 104 by using a fetch engine to fetch the data from memory 102, and then fetch the data back from memory 102, normally to the same memory 102 location.

Figure 2:
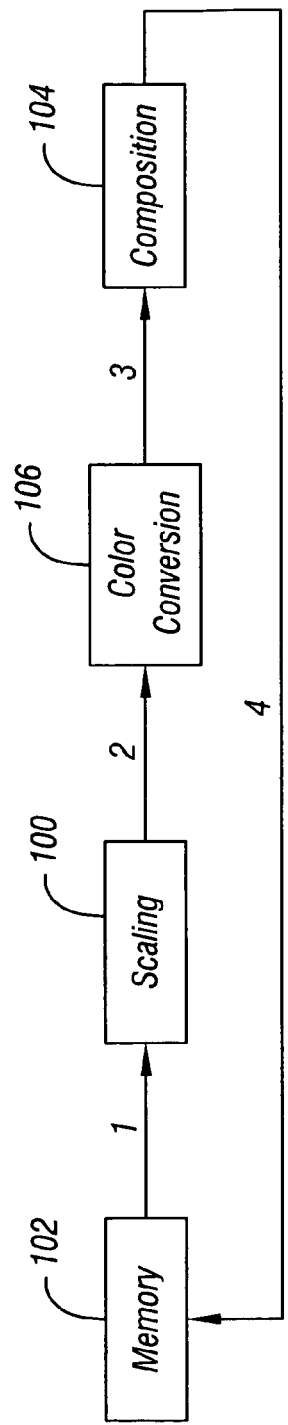
FIG. 2 is a schematic depiction of one embodiment of the present invention.

In accordance with one embodiment of the present invention, shown in FIG. 2, a serial architecture for pixel data transformations may be implemented. For example, the data may be fetched from memory 102 into a scaling engine 100 as indicated by the arrow 1. When the scaling is complete, the addresses for the data may be transformed to write the data to a color conversion engine 106 as indicated by the arrow 2. After color conversion, the data addresses may be transformed so that the data is written directly into a composition engine 104. Thereafter, the composed data may be written back to the memory 102 as indicated by the arrow 4. Thus, the operations accomplished with embodiments of the present invention may be more efficient than those of the prior art illustrated in FIG. 1.

The pixel data operations in accordance with one embodiment of the present invention may be termed passive as compared to the active operations utilized in the prior art. An application may write pixels to a range of virtual memory addresses and the passive engine may impose the chosen operation. A new "re-mapped" memory address is generated and the pixel data is written to the new memory location.

Any conventional transformation or operation performed on pixel data including but not limited to, scaling, color conversion and composition can be implemented using a passive engine. Moreover, as indicated in FIG. 2, the multiple transformations may be tied together and performed in a serial fashion by setting the output addresses of one function to the same range as the input address of another function.

Figure 3:
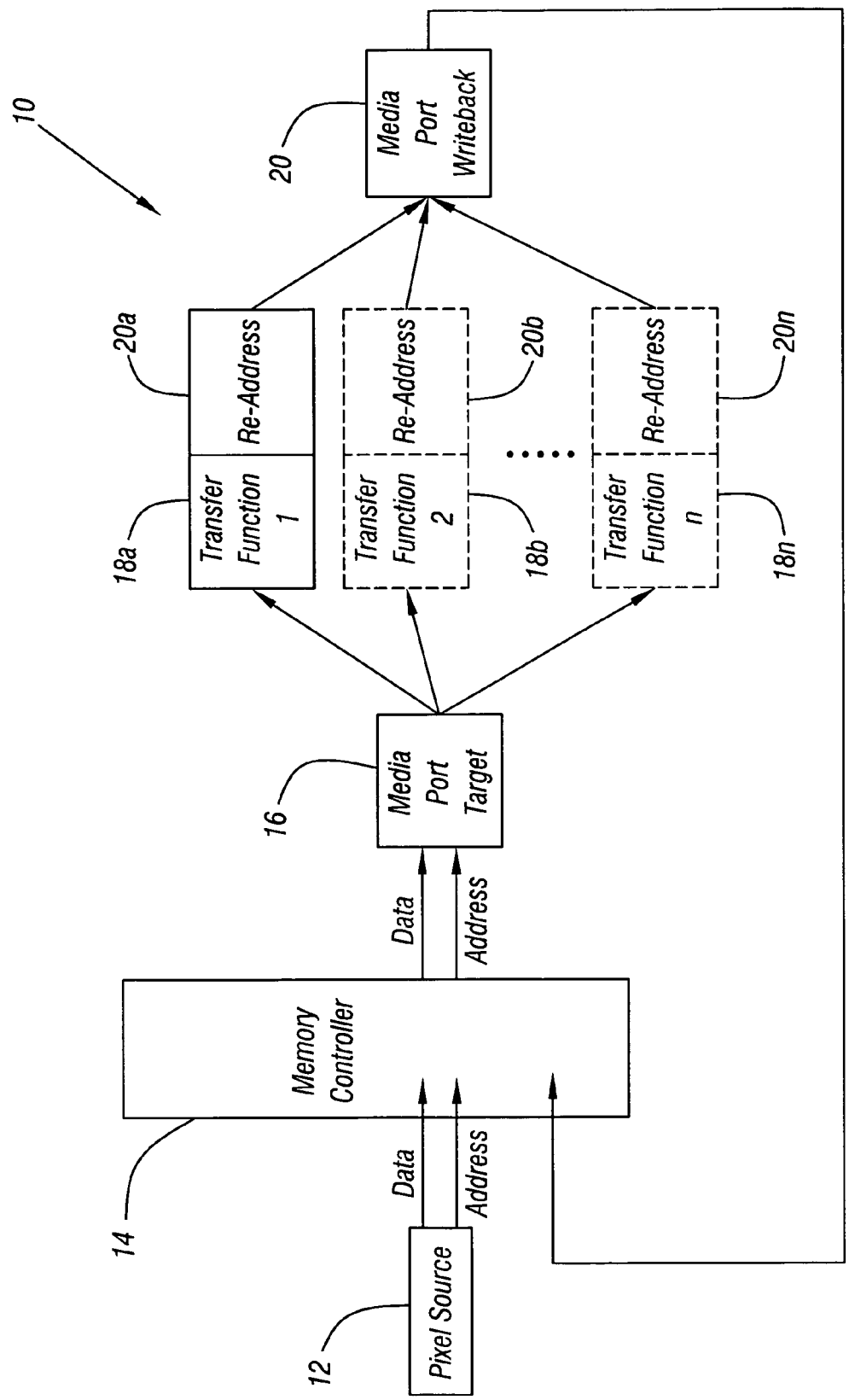
FIG. 3 is a more detailed schematic depiction of one embodiment of the present invention.

As shown in FIG. 3, a pixel source 12, that may be a processor, a graphics controller or another device, sends data and address information to a memory controller 14. Some of the information passed from the pixel source 12 to the memory controller 14 may map to a virtual memory range of a media port target 16. The media port target 16 is a memory controller client that accepts pixel data written to virtual addresses set aside by the operating system.

The media port target 16 may provide the data to a variety of transfer functions 18 whose purpose is to receive pixel data and addresses from the media port target 16, perform a pixel and address transformation, and forward output pixel data and addresses to a media port write back engine 20. The media port write back engine 20 is a write-only memory controller client that receives pixel and address information from the individual transfer functions 18 and forwards the pixel data and addresses to the memory controller 14.

The operating system cooperates with the media port target 16 to set up a range of virtual memory addresses for use by the media port target 16. The operating system may set aside a specific memory range as virtual addresses that map to the media port target 16. Pixel data written to this memory range is not forwarded to physical memory. Instead, that pixel data is forwarded to the media port target 16. Each of the transfer functions 18 is also assigned a virtual memory range within the overall virtual memory range set aside for the media port target 16.

Figure 4:
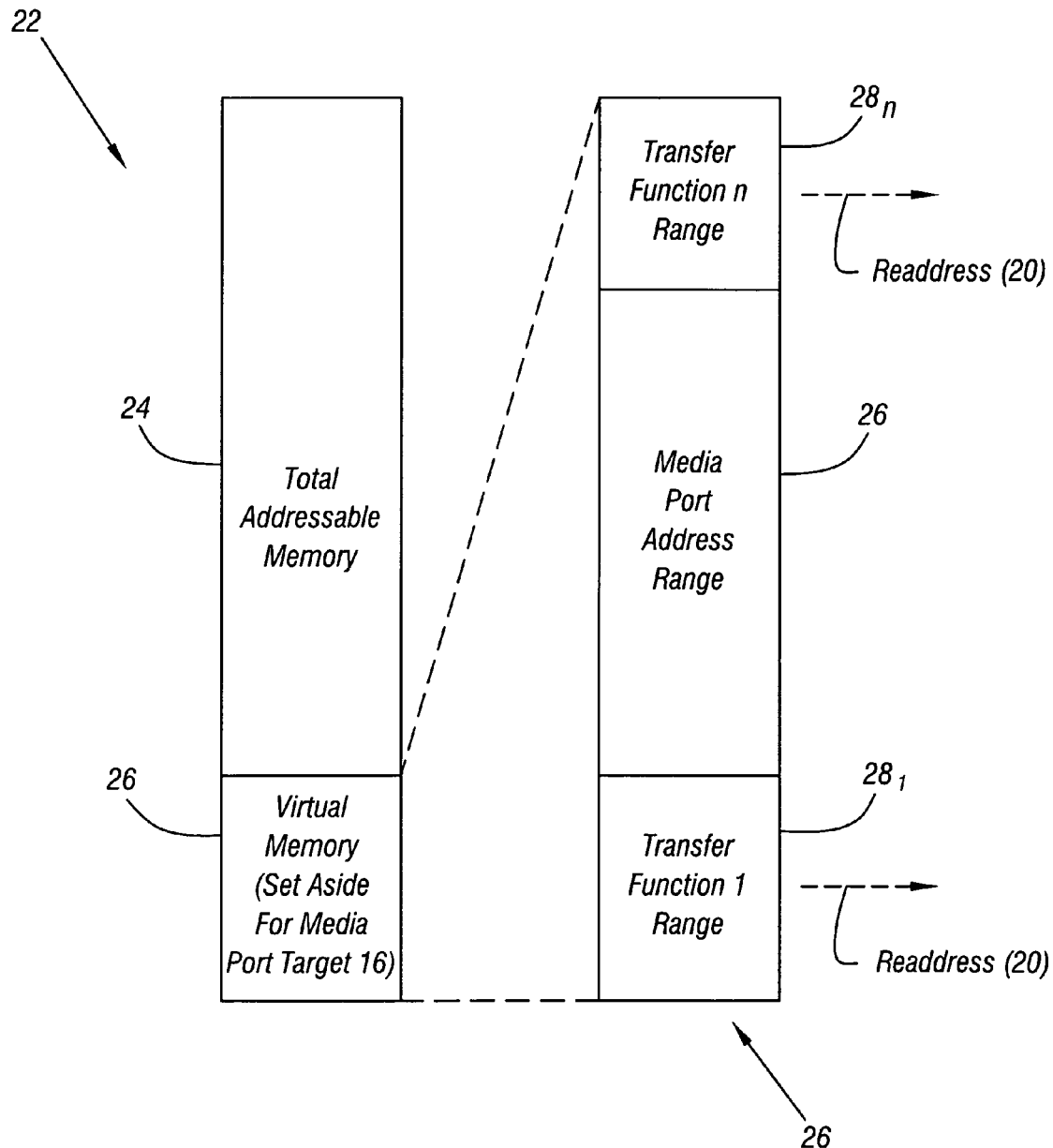
FIG. 4 shows the memory architecture of one embodiment of the present invention.

Thus, referring to FIG. 4, the total addressable memory 24 may include a portion 26 of virtual memory set aside for the media port target 16. Within the memory range 26, dedicated to the media port target 16, are transfer function address ranges $28_1$ through $28_n$, each dedicated one of n transfer functions 18. Each transfer function 18 defined in the media port target 16 has a defined output memory address range 28. Pixel data written to a transfer function memory address range 28 goes through a transformation and has its addresses translated or re-addressed as indicated at 20.

As a specific hypothetical example, the operating system may set aside the memory address range from 0x000000 to 0x800000 (8 megabytes) as virtual addresses that map to the media port target 16. The range of addresses from 0x000000 to 0x200000 may be set aside for a first transfer function 18 such as color conversion. The range of addresses from 0x200000 to 0x800000 may be set aside for a second transfer function 18. The color conversion function's output memory address range may be defined to be from 0x800000 through 0xA00000.

Each transfer function 18 performs a specific pixel transformation operation and address translation. The pixel data and addresses generated by the various transfer functions 18 may be written back to the memory controller 14. While a single memory port write back engine 20 is illustrated in FIG. 3, more than one media port write back engine 20 may be utilized to consolidate the pixel data and interfaces to the memory controller 14.

As another specific hypothetical example, the transfer function 18a may be the color space transformation from the RGB color space to YUV color space. For example, the base address "baseinput" of the input pixel data may be 0x000000. The base address "baseoutput" of the transfer function 18 output pixel data may be 0x800000. Applying the transfer function 18, the RGB to YUV conversion operation may be as follows:

$y = a1xR + a2xG + a3xB;$ $u = b1xR + b2xG + b3xB;$ $v = c1xr + c2xG + c3xB.$

The addresses of the pixel data after color space conversion are transformed from their original pixel addresses. First, the offset to each pixel is determined by subtracting the baseinput from each pixel's original address. Then, the offset is added to the baseoutput to get the new address.

In this way, each RGB pixel data may be converted through the transformation equation indicated above to output YUV pixel data. The output YUV pixel data is deposited at memory location 0x800000 to 0XA00000 in an example in which the baseoutput is 0x800000 and the available memory range stops at 0XA00000. Similarly, the new addresses of the color space transformed pixel data is the offset added to the baseoutput to position the pixel data in easily determined locations, for the next transfer function or for return to memory.

Figure 5:
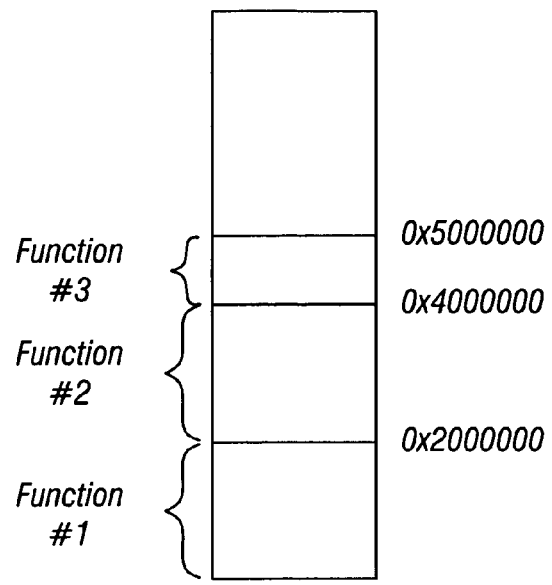
FIG. 5 is a flow chart for software useful in accordance with one embodiment of the present invention.

As another hypothetical example, a first transfer function, such as a color space conversion, may be implemented in the virtual memory address range from 0x000000 to 0x200000 as indicated in FIG. 5. A second transfer function, performing a 2:1 horizontal scaling, may be implemented in the virtual memory address range from 0x200000 to 0x400000. A third transfer function, performing a blurring operation, may be implemented in the virtual memory address range from 0x400000 to 0x500000.

The first through third transfer functions may be performed serially by setting the output memory address range of the first transfer function to start at 0x200000, and setting the output memory address range of the second transfer function to start at 0x400000. Pixel data written to the range from 0x000000 to 0x200000 is color converted and forwarded to the virtual memory address range from 0x200000 through 0x400000. This pixel data is then scaled by horizontal averaging and written to the virtual memory address range from 0x400000 through 0x500000. The final output data of this sequence may written to the output memory address range designated by the third transfer function.

Figure 6:
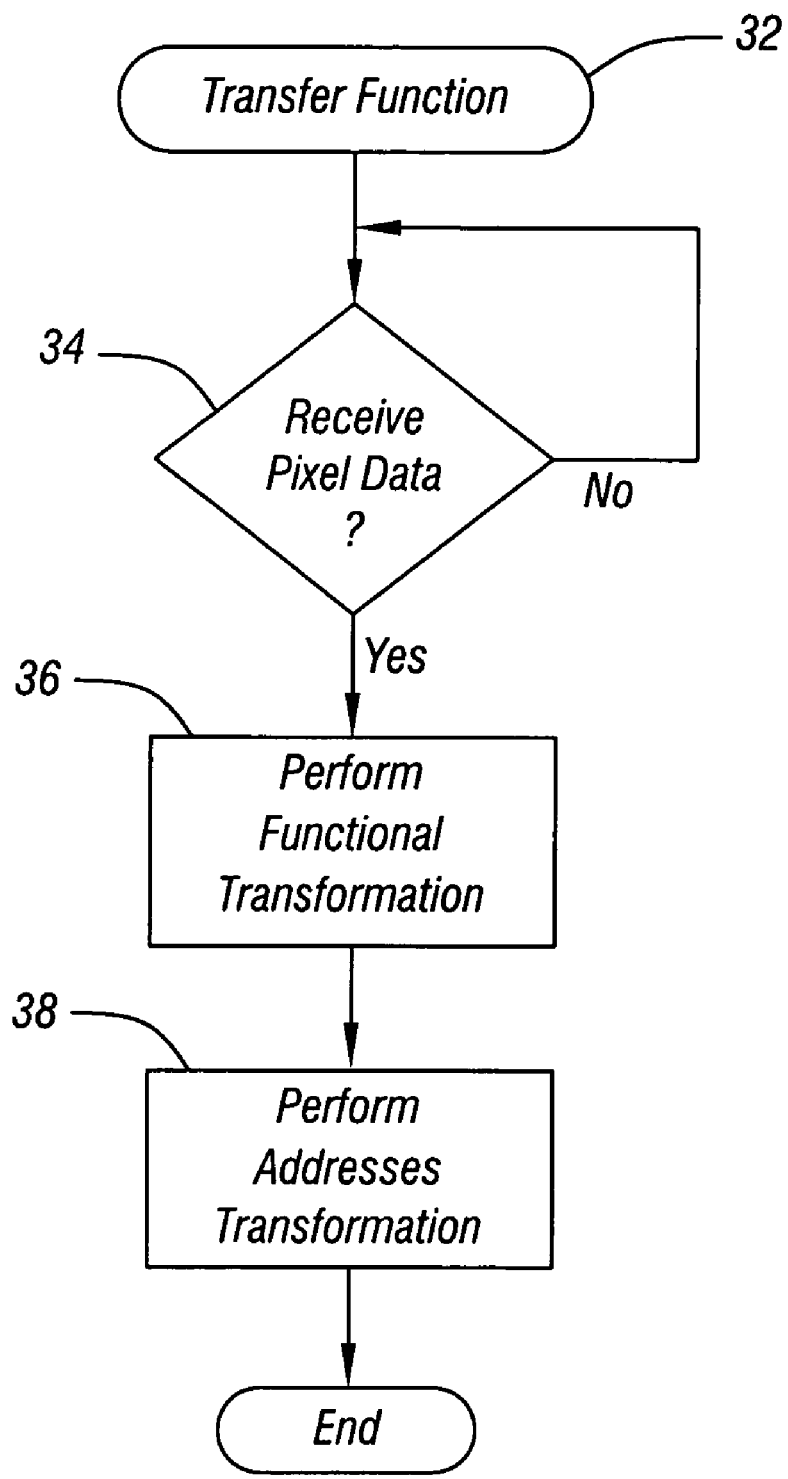
FIG. 6 is a flow chart useful with another embodiment of the present invention.

Transfer function software 32, shown in FIG. 6, may be stored in association with the memory controller 14, in accordance with one embodiment of present invention. Initially, the software 32 determines whether the pixel data has been received as indicated in diamond 34. If so, the first transfer function's transformation is performed as indicated in block 36. Thereafter, the address transformation is performed as indicated in block 38.

Figure 7:
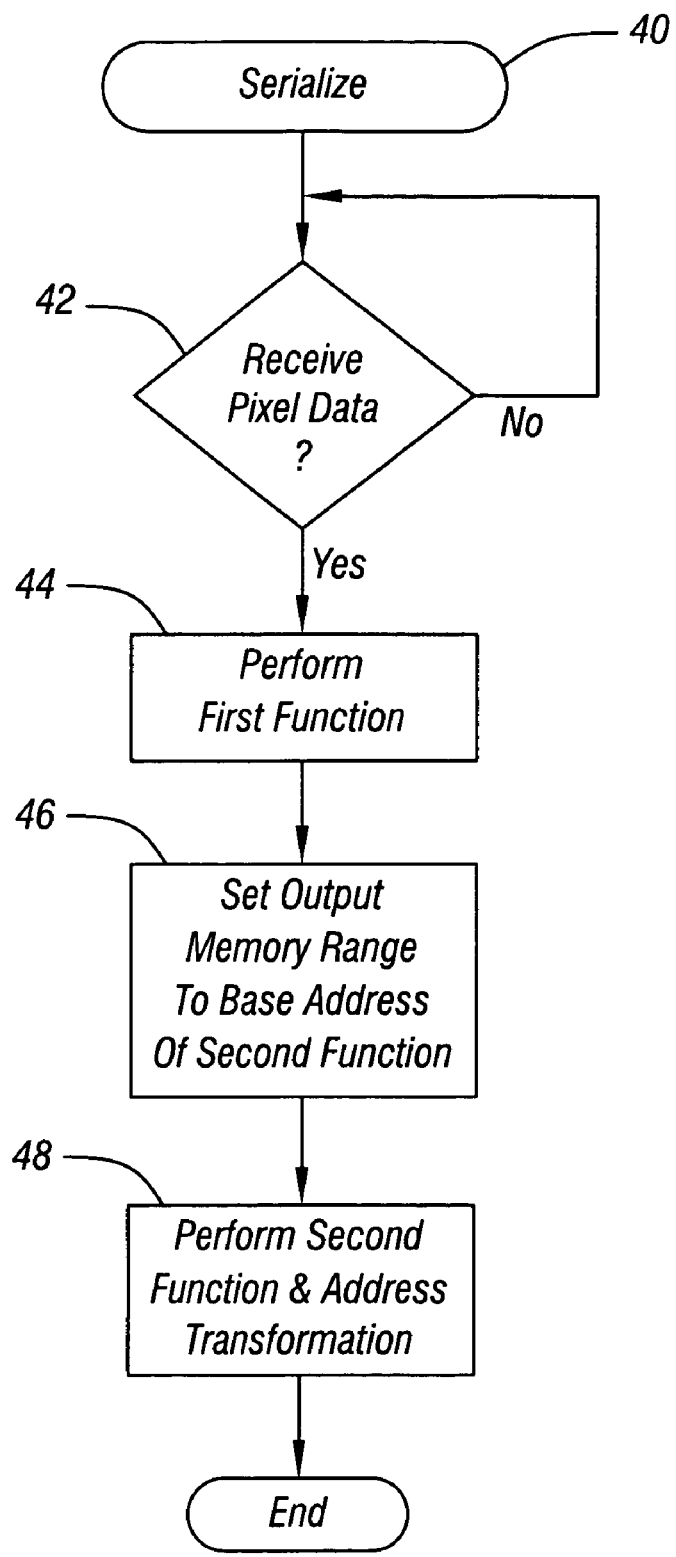
FIG. 7 shows a memory architecture in accordance with an embodiment of the present invention.

An example of serialized transformations is shown in FIG. 7. The software 40, in accordance with one embodiment of the present invention, determines in diamond 42 when the pixel data has been received. Upon receipt of the pixel data, the first transfer function is performed as indicated in block 44. Thereafter, the output memory address range is set to the base address of the second transfer function as indicated in block 46. The second transfer function may be performed followed by address transformation as indicated in block 48. The serial execution of transfer functions followed by address transformations may be extended to any number of transfer functions.

Figure 8:
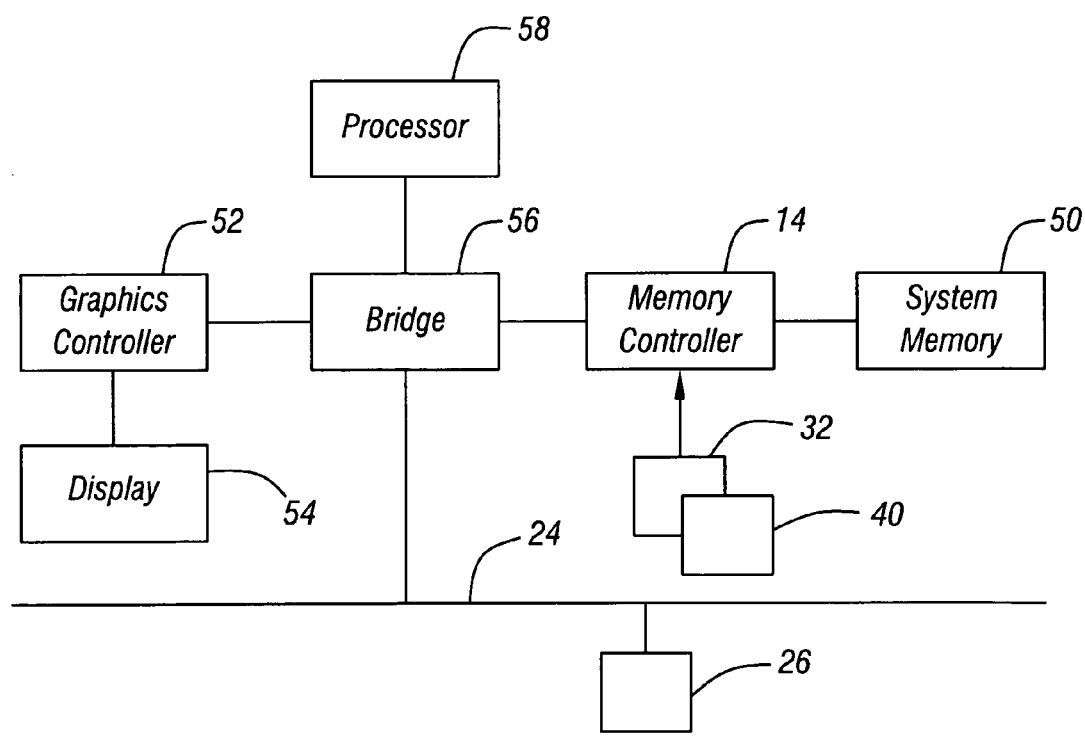
FIG. 8 is a block depiction of a processor-based system in accordance with one embodiment of the present invention.

Referring to FIG. 8, in accordance with one embodiment of the present invention, the memory controller 14 is coupled to system memory 50 and a bridge 56. The bridge 56 is in turn coupled to a processor 58 and a graphics controller 52. The graphics controller 52 may be coupled to a display 54. Thus, the pixel source 12 may be the processor 58, the graphics controller 52 or some other device. In one embodiment of the present invention, the software 32 and 40 may be stored in a storage associated with the memory controller 14. As is conventional, the bridge 56 is coupled to a bus 24. The bus 24 may include a peripheral device 26 as illustrated.

In some embodiments of the present invention, there may be no need to use a plurality of fetch engines having redundant pixel address generating functionality. These fetch engines may complicate the memory controller that arbitrates among all of the engines contending for memory bandwidth. Transfer functions may be implemented, in accordance with embodiments of the present invention, under the same master memory controller although other implementations may also be possible. In addition, memory bandwidth utilization may be reduced by the elimination of the read-modify-write cycle typically used in active architectures when imposing filtering operations after rendering. In accordance with some embodiments of the present invention, pixel data being generated may be written directly to one or more successive memory-mapped media ports that perform the desired filter operations before returning the pixel data to memory.

In some embodiments of the present invention, multiple filter operations may be flexibly allocated and serially applied through intelligent memory aliasing. If a programmer wants to impose color space transformations, followed by scaling, followed by convolution operations, the programmer may do so by simply mapping one operation's output into the input of the next operation. With conventional active systems, filter operations are typically implemented in the middle of a fetch and write back circuit. If several operations are implemented and only one is used, the other operations are effectively unusable for the duration of the operation because of the use of a single, standalone execution pipe.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: transferring pixel data to a transformation engine at a given memory address range; performing a transformation on the pixel data; and readdressing the transformed pixel data to another memory address range of a second transformation engine using the transformation engine and without using a fetch engine.

2. The method of claim 1 further including:
manipulating the transformed pixel data without going between a memory location and another transformation engine.

3. The method of claim 2 further including:
writing pixel data to a first virtual memory location; and performing a first pixel transformation at said first virtual memory location in a virtual memory space.

4. The method of claim 3 further including:
generating a virtual memory address for a second memory location.

5. The method of claim 4 further including:
re-mapping a virtual memory address of said first virtual memory location to write said transformed pixel data from said first virtual memory location to said virtual memory address of said second memory location; and transferring the pixel data to a memory controller using a memory controller client in a forward, write-through direction.

6. The method of claim 5 further including writing pixel data to a virtual memory location associated with a memory controller client that receives pixel data written to certain virtual addresses.

7. The method of claim 6 including causing an operating system to set aside virtual addresses for said memory controller client.

8. The method of claim 5 wherein generating said virtual memory address for said second memory location includes transforming the addresses of said pixel data at said first virtual memory location to addresses at said second memory location.

9. The method of claim 8 including determining the offset to pixel data by subtracting a base address at said first virtual memory location from the address of pixel data.

10. The method of claim 9 including adding said offset to a base address of said second memory location.

11. The method of claim 5 wherein writing said transformed pixel data from said first virtual memory location to said second memory location includes writing the pixel data from said first virtual memory location associated with a first transfer function that performs the transformation on the pixel data to said second memory location associated with a second transfer function that performs a second transformation on the transformed pixel data.

12. The method of claim 11 including transforming the addresses of the pixel data from addresses in a first virtual memory range associated with said first transfer function to memory addresses in a second virtual memory range associated with said second transfer function.

13. An article comprising a medium storing instructions that enable a processor-based system to: transfer pixel data to a transformation engine at a given memory address range; perform a transformation on the pixel data; and readdress the transformed pixel data to another memory address range of a second transformation engine using the transformation engine and without using a fetch engine.

14. The article of claim 13 further storing instructions that enable the processor-based system to:
manipulate the transformed pixel data without going between a memory location and another transformation engine.

15. The article of claim 14 further storing instructions that enable the processor-based system to:
write pixel data to a first virtual memory location; and perform a first pixel transformation at said first virtual memory location in a virtual memory space.

16. The article of claim 15 further storing instructions that enable the processor-based system to:
generate a virtual memory address for a second memory location.

17. The article of claim 16 further storing instructions that enable the processor-based system to:
re-map a virtual memory address of said first virtual memory location to write said transformed pixel data from said first virtual memory location to said virtual memory address of said second memory location; and transfer the pixel data to a memory controller using a memory controller client in a forward write-through direction.

18. The article of claim 17 further storing instructions that enable the processor-based system to write pixel data to a virtual memory location associated with a memory controller client that receives pixel data written to certain virtual addresses.

19. The article of claim 18 further storing instructions that enable the processor-based system to cause an operating system to set aside virtual addresses for said memory controller client.

20. The article of claim 17 further storing instructions that enable the processor-based system to transform the addresses of pixel data at said first virtual memory location to addresses at said second memory location.

21. The article of claim 20 further storing instructions that enable the processor-based system to determine the offset to each pixel data by subtracting a base address at said first virtual memory location from the address of each pixel data.

22. The article of claim 21 further storing instructions that enable the processor-based system to add said offset to a base address of said second memory location.

23. The article of claim 17 further storing instructions that enable the processor-based system to write said pixel data from said first virtual memory location associated with a first transfer function that performs the transformation on the pixel data to said second memory location associated with a second transfer function that performs a second transformation on the transformed pixel data.

24. The article of claim 23 further storing instructions that enable the processor-based system to transform the addresses of said pixel data from addresses in a first virtual memory range associated with said first transfer function to memory addresses in a second virtual memory range associated with said second transfer function.

25. A system comprising:
   a memory controller to receive pixel data and virtual memory addresses for a transformation of the pixel data in a virtual memory space;
   a first memory controller client to forward the pixel data and virtual memory addresses to a first transfer function to perform the transformation of the pixel data; and
   a second memory controller client to receive data from said first transfer function together with new virtual memory addresses for transfer in a forward, write-through direction without using a fetch engine.

26. The system of claim 25 wherein said first memory controller client is to selectively forward the pixel data and virtual memory addresses to one of a plurality of transfer functions and said second memory controller client is to receive the pixel data with new virtual memory addresses from the one of said plurality of transfer functions.

27. The system of claim 26 wherein said second memory controller client is to write the pixel data back to said memory controller.

28. The system of claim 25 including a plurality of transfer functions to perform transformations on the pixel data, one of said transfer functions arranged to write output data to an address range of another of said transfer functions.

29. The system of claim 28 wherein said transfer functions are associated with virtual memory address ranges.

* * * * *